No. 700,869. Patented May 27, 1902.
K. A. WILDE.
ELECTRODE.
(Application filed Sept. 22, 1900.)
(No Model.)

UNITED STATES PATENT OFFICE.

KARL ADOLF WILDE, OF GLINDE, NEAR HAMBURG, GERMANY.

ELECTRODE.

SPECIFICATION forming part of Letters Patent No. 700,869, dated May 27, 1902.

Application filed September 22, 1900. Serial No. 30,808. (No model.)

*To all whom it may concern:*

Be it known that I, KARL ADOLF WILDE, a subject of the German Emperor, and a resident of Glinde, near Hamburg, in the German Empire, have invented certain new and useful Improvements in Electrodes, of which the following is a specification.

The present invention relates to certain improvements in the construction of electrodes preferably destined for use in secondary batteries or accumulators, and particularly of such electrodes which are made or produced by rolling, stamping, or casting any suitable electrode material, preferably lead, in the form of strips and are adapted to be arranged side by side and connected with one another by suitable means in order to form a composite electrode-plate.

The manufacture or production of my improved electrodes is effected according to my improved system of distribution of the electrode material, which distribution system will be described later on. The several modifications of this system allow the production of electrodes which comply with the requirements reasonably to be made of such electrodes in a better manner than the electrodes hitherto in use and which allow also repeated re-forming.

In order that my invention may be fully understood, I shall now proceed to describe the same in detail with reference to the accompanying sheet of drawings, in which—

Figure 1:
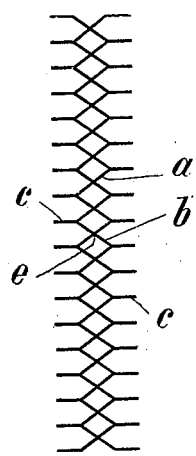
Figure 2:
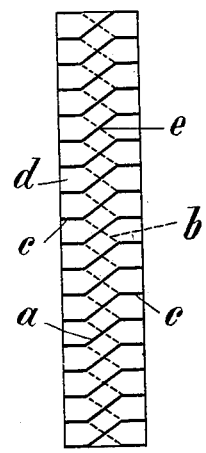
Figure 3:
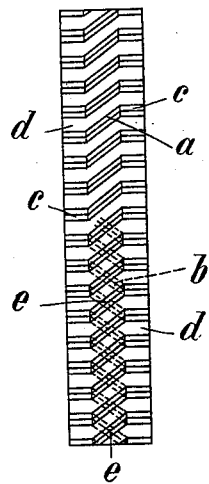
Figure 4:
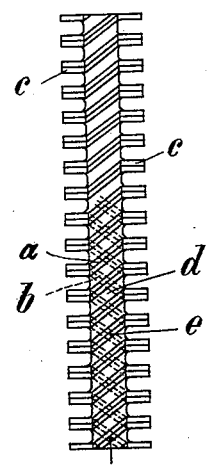

Figure 1 is a diagram illustrating the arrangement or structure of the carrier of my improved electrode. Fig. 2 is a similar diagram illustrating a modification of the said structure. Fig. 3 is a side elevation of an electrode made in accordance with and embodying the present invention, and Fig. 4 is a similar elevation showing a modification.

Similar letters refer to similar parts throughout the several figures.

The principle according to which my improved electrodes are constructed is based upon a chain structure arranged in accordance with the laws of a single or multiplex helix. The said chain structure is formed by crossing straight, curved, or zigzag-shaped bars or links $a$ and $b$, Fig. 1, at any suitable angle, so as to produce a carrier or conducting-chain in which the several bars or links $a$ and $b$ of any suitable cross-section are oppositely directed to or respectively run at an angle to the working faces of the electrode and are solidly connected with one another at the crossing or registering parts $e$ and $c$, the crossing and registering lateral ends $c$ of the bars or links $a$ and $b$ constituting working heads or studs which form the above-mentioned working faces of the electrode. It is to be understood that by "working surfaces" is meant those faces of the electrode which look upon the contrarily-polarized adjacent electrodes. The present chain structure may also be imagined as a flat-pressed single or double threaded fillet of a screw. From the well-known electrodes having a rib or ribs arranged in a helical line around a central conducting-core the improved electrode, however, differs in that the imagined flat-pressed thread or fillet has not the same cross-sectional area throughout its length, but is reinforced in material at that place or point which, in consequence of the imagined flat pressing, cross or register with one another. In an electrode having the bars or links arranged in the form of a double or multiplex threaded helix the bars or links $a$ and $b$ cross one another thrice or several times, respectively. The oppositely-directed bars or links of my improved chain-structure electrode appear, therefore, to be in the same arrangement with respect to one another as the crossing members or links of a lazy-tongs, the only difference being that the said links or bars are not pivotally connected at the crossing or registering points, as in the case of a lazy-tongs, but are solidly and rigidly connected at such points.

When a partition or foil $d$, Fig. 2, is employed between the two sets of bars or links $a$ and $b$, the latter are arranged as ribs in the form of a helical line on the flat sides of the said foil or carrier-plate $d$ and are solidly connected at their crossing and registering points, respectively, through such carrier-plate $d$. The chain structure of the electrode, that is to say, the arrangement and position of the members $a$ and $b$ are not altered by such foil or carrier-plate.

The cross-sectional area of the bars or links is to be varied in accordance with the desired superficial area and life of the electrode.

The number of crossing-points in the chain structure depends upon the ascent, the length, the cross-sectional area, and the spacing distance of the bars or ribs, respectively, whereas the ascent of the bars or ribs is determined by the desired rates of the escape of the gases from the electrode and of the circulation or diffusion of the electrolyte.

When the chain structure is constructed according to the laws of a double or multiplex threaded helix, the reinforced crossing-points $e$ in the middle portion of the electrode confer upon the latter additional rigidity and strength and form thereby a central longitudinal zone, which serves as the backbone of the electrode and increases its conductibility.

In carrying my invention into practice the arrangement, dimensions, &c., of the bars or ribs will be chosen or selected in the most cases in such a manner that the bars or ribs cross themselves thrice, because this modification of the chain electrode possesses the better or more reliable disposition for compensating all strains acting upon the electrode.

According to the example shown by Fig. 3 the crossing bars or links of my improved chain structure are arranged as zigzag-shaped ribs in the form of a double helix on the flat sides of a thin carrier-plate, so that my improved electrode practically consists of a plate or strip $d$ of lead, which is provided upon its two opposite flat sides or faces with a series of parallel or nearly parallel zigzag-shaped projections or ribs $a$ and $b$. These sets of ribs are best arranged in the manner shown, so that the ribs or their middle parts, respectively, of the one side run at an angle to the longitudinal center line of the electrode and cross the corresponding ribs of the other side at any suitable angle. The lateral ends or branches of the zigzag-shaped ribs, which run horizontally, or about so, register or nearly register with the lateral ends of the corresponding ribs of the other side, whereby lateral heads or studs $c$ are produced, the length of which varies according to the length of the horizontal ends of the zigzag-shaped ribs, the arrangement being such that the crossing zigzag-shaped ribs $a$ and $b$, carried by a central comparatively thin sheet $d$, are secured to but very thin foils, whereas the actual and reliable connection of the ribs and their lateral ends is effected by the solid coherence or union of such ribs and lateral ends at the crossing and registering points, respectively. At the crossing-points $e$, as well as at the registering-points $c$, of the zigzag-shaped ribs the electrode has of course a greater thickness in material than at other parts. These reinforced parts of connection or union confer upon the electrode additional rigidity and strength and increase the conducting ability of such electrode, as mentioned already above. The working parts of the electrodes, so to speak, are constituted by the lateral heads or studs $c$, formed by the registering ends of the ribs $a$ and $b$.

In positive electrodes or in electrodes destined for re-forming, which electrodes are preferably produced by rolling or stamping, the foil between the heads or studs $c$ shall be only of such thickness that on producing the electrode the said foils are very soon formed thoroughly, therefrom resulting the first active layers and a working face or faces, respectively, which are formed by the said suitably-shaped preferably conical studs or heads, which besides a good contact give a very reliable hold to the active layers, so that the latter are prevented from crumbling and falling off, even if the electrode should happen to have been subjected to a long and heavy strain, deformation and short-circuiting being entirely avoided with my improved electrode built up according to the above-described novel chain structure with working heads or studs.

In Fig. 4 I have shown as example an electrode of my improved chain-structure type in which the thin lead foils between the heads or studs $c$ have been thoroughly formed or removed, respectively, by the action of the electrolyte.

When the improved electrode or electrodes are to be formed according to the Faure method—that is to say, by pasting the thin foils between the working heads or studs, which foils result from the the rolling or stamping process—they may be perforated or removed entirely or partially before pasting the electrode. When the improved electrode or electrodes are produced by casting, the said foils may be omitted from the beginning. Such a cast electrode has then about the appearance of the electrode shown in Fig. 4. In such an electrode the active mass is allowed to wind in the form of serpentine line around the chain structure and to connect or unite through the free spaces or openings in such chain structure. The active mass is thus retained under all conditions in the most intimate contact with the chain structure, serving at the same time as carrier and conductor.

Those parts of my improved electrode which are most exposed to oxidation may be reinforced in material at will or as required, whereas those parts of the electrode which are not so much exposed may be made lighter in material in accordance with the requirements of the conducting and carrying abilities of the electrode and the circulation of the electrolyte.

The advantages of the electrodes made in accordance with my new system chiefly consist in that the parts of the electrode which serve as carrier and conductor are evolved or constructed as screw areas, that reinforcements in material are obtained at the crossing or registering points of the bars or ribs forming the improved chain structure, that a reliable escape or delivery of the developed gases and perfect circulation of the electrolyte are assured, and that the working faces of the electrode are formed by heads or studs. As for the electrolytic process that development of area is the most favorable which shows no or but the smallest planes and straight lines. The distribution of material in my improved electrode can be imagined as to be of absolute perfection.

In my improved electrode, moreover, the working parts which are most subjected to the processes of oxidation and reduction are not able to transmit or transfer their alterations or deformations, if any, to the more central parts, which serve as the carrier and conductor.

My improved electrodes finally admit of a very reliable connection by soldering, as the solder can penetrate or intrude into and between the chain structure or its parts, respectively.

Having fully described my invention, what I claim, and desire to secure by Letters Patent, is—

1. A flat electrode for secondary batteries comprising a carrier formed of a suitable material, provided with a substantially helical groove and an active material in said groove, substantially as and for the purpose set forth.

2. An electrode-carrier composed of a suitable material and provided with a plurality of substantially helical ribs, and lateral projections formed on said ribs at opposite sides of the electrode, substantially as and for the purpose set forth.

3. An electrode-carrier composed of a suitable material and provided with a plurality of ribs arranged to form a multiplex helix, and lateral projections at opposite sides of the electrode at each turn of the helix, substantially as and for the purpose set forth.

4. A flat electrode-carrier composed of a suitable material and having inclined ribs arranged in the form of a multiplex helix, substantially as and for the purpose set forth.

5. An electrode-carrier composed of ribs of a suitable material inclined in opposite directions on opposite sides of the electrode, connected at their crossing and lateral ends on each inclined rib, substantially as and for the purpose set forth.

6. An electrode-carrier composed of ribs of a suitable material inclined in opposite directions on opposite sides of the carrier, a plate between the series of ribs, said ribs and plate connected at their crossing-points and lateral ends on each inclined rib, substantially as and for the purpose set forth.

7. An electrode-carrier comprising a plate, inclined ribs on one side thereof inclined in one direction and similar ribs on the opposite side inclined in an opposite direction, and lateral ends on each inclined rib, the plate being cut away between said ends, substantially as and for the purpose set forth.

KARL ADOLF WILDE.

Witnesses:
MAX LEMCKE,
E. H. L. MUMMENHOFF.